Figure 1:
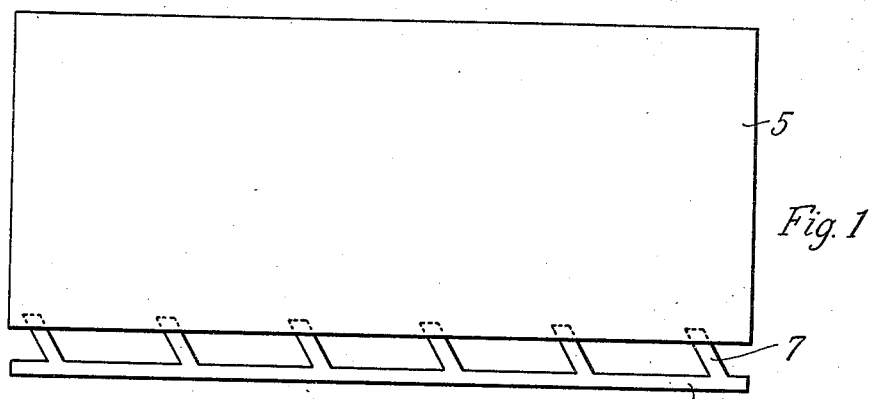

Mar. 27, 1923.　　　　　　　　　　　　　　　　　1,450,013
J. J. BAUER
BUILDING BLOCK
Filed Sept. 22, 1921

INVENTOR:
Julius J. Bauer
By E. J. Andrews
Atty.

Patented Mar. 27, 1923.

1,450,013

UNITED STATES PATENT OFFICE.

JULIUS J. BAUER, OF CHICAGO, ILLINOIS.

BUILDING BLOCK.

Application filed September 22, 1921. Serial No. 502,497.

*To all whom it may concern:*

Be it known that I, JULIUS J. BAUER, a citizen of the United States, residing at Chicago, in the county of Cook and State of Illinois, have invented certain new and useful Improvements in Building Blocks, of which the following is a specification.

This invention relates to building blocks and it has for its object the production of suitable artificial building blocks for forming the walls of buildings such as residences, factories, or the like, particularly when, for any reason, it is desired to prevent moisture accumulating on the surface of the walls of the building, due to the composition of the blocks forming the walls. It has been found that ordinary artificial stone blocks and other substances, of which the walls of a building are often formed, have a tendency to accumulate moisture on their surfaces and this injuriously affects the paper, woodwork, plaster, or other substances which may be attached to the walls; and even when the blocks are not covered with any such substances the moisture gathering on the surface of the blocks is found very objectionable.

I have found that this condition is due to the condensing of the moisture in the air on the surface of the walls, particularly when there is a change in temperature, and to the inability of the ordinary stones to absorb the moisture, so that, by the time the condensation has ceased, the moisture will be largely accumulated on the surface of the wall. I have also found that by coating, in some suitable manner, the surface of the stone or other objectionable substances of which the blocks may be made, with some suitable moisture absorbing substance, the substance will absorb so much of the moisture that ordinarily, when the condensation ceases, the surface of the substance will still be substantially dry and will very quickly dry off if any moisture appears on the surface. While any suitable substance may be used for coating the building blocks, I prefer for the purpose terra-cotta, and herein it may be understood that terra-cotta is referred to in illustrating my invention.

Efforts have been made to overcome the tendency of the moisture to accumulate on the surface of the walls formed from building blocks, or the like, by providing hollow blocks, and particularly by forming the walls of the hollow blocks as thin as possible, without reducing too much the resistance to crushing of the blocks. But this also has been found insufficient, as the inability of the blocks to absorb moisture always leaves more or less moisture on the surface thereof, although the hollow walls formed by such blocks are an improvement over the solid walls. I, therefore, prefer to produce hollow spaces in the blocks which I provide, and to accomplish this I prefer to attach the terra-cotta to the main blocks in such a way that the terra-cotta is spaced away from the surface of the blocks, leaving a chamber between the terra-cotta and the surface of the blocks, although it is to be understood that the moisture disadvantage is partly eliminated by the use of sheets of terra-cotta, or other suitable substances, directly in contact with the blocks. By forming the spaces, however, the drying tendency of the air, as soon as the conditions causing condensation have ceased, is materially increased because the air acts on both sides of the terra-cotta, and at the same time any moisture forming on the surface of the main blocks is not absorbed by the spaced terra-cotta.

Figure 2:
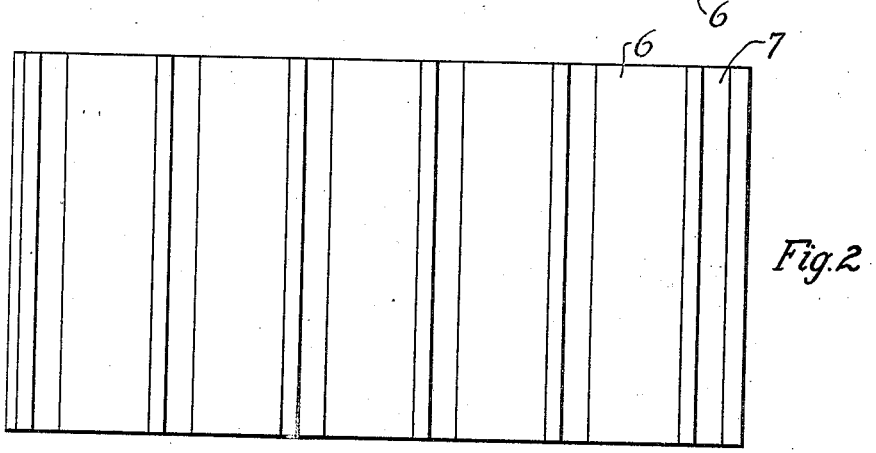

Of the accompanying drawings Fig. 1 is a plan view of a building block, faced with terra cotta, which embodies the features of my invention; Fig. 2 is a rear view of the terra-cotta facing before it is applied to the block; and Fig. 3 is an elevation of a wall formed from the building blocks, the left-hand portion being completed and the right-hand portion being incomplete.

Any desirable shape and size of building blocks may be provided according to my invention, and the blocks proper may be solid or hollow as desired, as the shape, size, or solidity of the blocks proper is not a part of my invention. The terra-cotta or similar substance may be attached to the surface of the blocks in any suitable manner, either in contact with the blocks, or spaced therefrom, and the terra-cotta may be of any suitable thickness. For ordinary building blocks which are substantially twelve by twenty-four inches, I prefer to form the body portion out of blocks 5, substantially ten by twelve by twenty-four inches, and to face one of the twelve by twenty-four inch surfaces by a sheet of terra-cotta 6 substantially one-half inch thick, and spaced away from the block substantially one inch. Also I prefer to have the dimensions of the sheet of terra-cotta slightly less than those of the surface of the stone, the sheet being perhaps one-eighth of an inch shorter and narrower than the surface, so that each edge of the terra-cotta is about one-sixteenth of an inch from the plane in which the end of the edge of the block lies.

The sheet of terra-cotta may be fastened to the block in any suitable manner. But in the use of artificial blocks I prefer to attach the sheets to the blocks as the blocks are formed; and for this purpose I prefer to form the sheets of terra-cotta with lugs or flanges 7 projecting from one surface, and to have the outer edges of the flanges fixed into the block. Any suitable lugs or flanges may be used but I prefer flanges 7 extending across the sheets substantially from one edge to the other, being substantially one-half inch thick and one and one-half inch wide, and spaced a suitable distance apart so as to properly support the sheets. In practice I prefer to space them about five inches apart with the end flanges spaced about one inch from the ends of the blocks. In order to imbed the flanges more firmly in the blocks I prefer to have them project at an oblique angle from the surface of the sheets, thus giving a better gripping surface; and, if desired, the flanges may be so formed that, when the blocks are in place, the flanges will project angularly downwardly from the sheets, so that the weight of the sheets and flanges will at all times tend to prevent the flanges from moving outwardly from the stone in case they should become loose.

Figure 3:
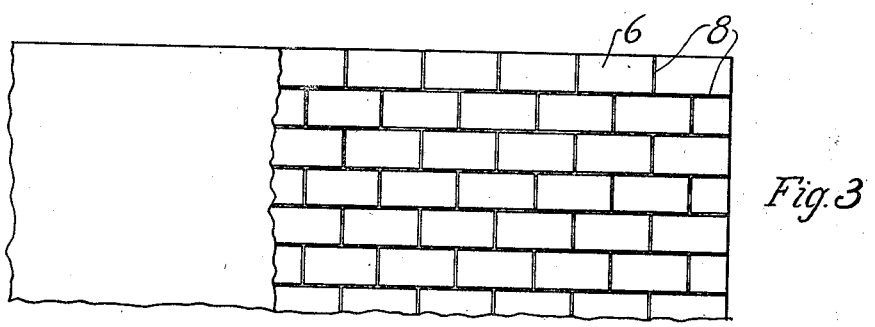

In forming the walls the blocks may be staggered as is common, with the terra-cotta projecting into the room; and, after the walls have been laid, the spaces 8 between the edges of the terra-cotta are pointed with suitable material, such as that of which the terra-cotta is composed, so as to present a plain continuous surface for the wall of the room, as indicated at the left end of Fig. 3. This surface then may be finished in any manner desired such as by plastering, calcimining, painting, or papering; or the terra-cotta surface itself may be formed suitably without any decoration whatever.

The porosity of the terra-cotta may be such as to cause the plaster to adhere to the surface without laths or other means of support; and this porosity, together with the affinity of the terra-cotta for moisture, will cause the moisture to be absorbed into the interior portion of the terra-cotta as rapidly as deposited, until condensation ceases. The moisture then will be given up slowly to the air if it becomes sufficiently dry. The terra-cotta thus forms what may be called a storage reservoir to receive the moisture when the air is too moist, and to give it up when the air is too dry; and thus it equalizes the relative humidity of the air. Also the nature of terra-cotta as compared with stone is such as to cause less condensation than stone in the case of temperature changes.

I claim as my invention:

1. A building block comprising a stone having a substantially plane surface, a sheet of moisture absorbing substance, and a plurality of flanges extending from said sheet to said stone and fixed to the sheet and to said stone, and spacing the sheet a material distance away from said stone.

2. A block substantially according to claim 1, said flanges being at oblique angles to the surface of said stone.

3. An article of manufacture comprising a sheet of moisture absorbing substance, said sheet forming an elongated rectangular parallelepiped, and a plurality of transverse flanges extending outwardly a material distance from one side of said sheet.

In testimony whereof, I hereunto set my hand.

JULIUS J. BAUER.